(12) United States Patent
Jonas et al.

(10) Patent No.: US 10,678,254 B1
(45) Date of Patent: Jun. 9, 2020

(54) AUTOMATED DRIVE UNITS WITH CLEANING MODULES FOR INVENTORY SYSTEMS

(71) Applicant: Amazon Technologies, Inc., Seattle, WA (US)

(72) Inventors: Jude Royston Jonas, Hudson, NH (US); Peter Thomas Colantonio, North Andover, MA (US); Barbara Maia Araujo Lima, Houston, TX (US); Benjamin Fritz Schilling, Lancaster, CA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 15/719,251

(22) Filed: Sep. 28, 2017

(51) Int. Cl.
| | |
|---|---|
| *A47L 9/00* | (2006.01) |
| *G05D 1/02* | (2020.01) |
| *A47L 9/28* | (2006.01) |
| *A47L 9/12* | (2006.01) |
| *A47L 9/04* | (2006.01) |
| *A47L 9/06* | (2006.01) |
| *A47L 9/14* | (2006.01) |
| *A47L 5/22* | (2006.01) |

(52) U.S. Cl.
CPC .............. *G05D 1/0229* (2013.01); *A47L 5/22* (2013.01); *A47L 9/009* (2013.01); *A47L 9/0411* (2013.01); *A47L 9/0444* (2013.01); *A47L 9/0477* (2013.01); *A47L 9/0606* (2013.01); *A47L 9/127* (2013.01); *A47L 9/14* (2013.01); *A47L 9/2821* (2013.01); *A47L 9/2842* (2013.01); *A47L 9/2857* (2013.01); *A47L 9/2873* (2013.01); *A47L 9/2884* (2013.01); *A47L 9/2894* (2013.01); *G05D 1/0291* (2013.01); *A47L 2201/022* (2013.01); *A47L 2201/04* (2013.01); *A47L 2201/06* (2013.01); *G05D 2201/0203* (2013.01); *G05D 2201/0215* (2013.01)

(58) Field of Classification Search
CPC ................................ G05D 1/0229; A47L 5/22
See application file for complete search history.

(56) References Cited

U.S. PATENT DOCUMENTS

| | | |
|---|---|---|
| 8,280,547 B2 | 10/2012 | D'Andrea et al. |
| 9,087,314 B2 | 7/2015 | Hoffman et al. |

(Continued)

*Primary Examiner* — Jess Whittington
(74) *Attorney, Agent, or Firm* — Kilpatrick Townsend & Stockton LLP

(57) ABSTRACT

A drive unit with a cleaning module for cleaning an inventory system includes a frame, a drive module, a blower module, and at least one cleaning module mounted to the frame. The drive module includes at least two drive wheels that can move the unit, and the blower module can generate negative pressure in a debris container for applying to one or more cleaning modules. A first cleaning module includes a rotating brush and spans a cleaning path at least as wide as the drive wheels of the drive module as the drive unit with a cleaning module operates. Some cleaning-enabled drive units can include a bifurcation of the first cleaning module to avoid damaging fiducial markings in the inventory system. Such units include a second cleaning module with a stationary brush positioned in line with the bifurcation to clean the fiducial markings along the cleaning path without causing damage.

21 Claims, 14 Drawing Sheets

(56) References Cited

U.S. PATENT DOCUMENTS

| | | | | |
|---|---|---|---|---|
| 2005/0055792 A1* | 3/2005 | Kisela | ............ | A47L 5/36 |
| | | | | 15/319 |
| 2005/0166356 A1* | 8/2005 | Uehigashi | ............ | A47L 5/30 |
| | | | | 15/319 |
| 2006/0185690 A1* | 8/2006 | Song | ............ | A47L 11/34 |
| | | | | 134/21 |
| 2010/0299863 A1* | 12/2010 | Dewing | ............ | E04H 4/1609 |
| | | | | 15/347 |
| 2013/0146090 A1* | 6/2013 | Ko | ............ | G05D 1/021 |
| | | | | 134/18 |
| 2019/0029486 A1* | 1/2019 | Suvarna | ............ | A47L 9/2831 |

* cited by examiner

AUTOMATED DRIVE UNITS WITH CLEANING MODULES FOR INVENTORY SYSTEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow and become increasingly automated, the challenges of maintaining efficient throughput and completing a large number of packing, storing, sorting, retrieving, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. As such inventory systems grow, the need for routine cleaning and maintenance grow with them. However, performing such tasks in a large inventory system becomes more challenging as the size and complexity of inventory systems increase. At the same time, it becomes more expensive and therefore difficult to justify system downtime for cleaning and maintenance tasks as inventory system throughputs increase.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein disclosed relate generally to inventory management systems that include a workspace or material handling grid for managing inventory using unmanned drive units to move the inventory about the workspace. Specifically, embodiments relate to unmanned drive units with cleaning modules that are operable to navigate the workspace and remove debris from the workspace without disrupting the operation of the various working drive units. In some embodiments, drive units with cleaning modules may also be operable to move inventory in a similar manner to the drive units as described below with reference to system 10 (FIGS. 2-5). In at least one embodiment, drive units with cleaning modules include a cleaning element with a rotary brush that spends a width of the drive unit. In some embodiments, drive units with cleaning modules include two cleaning modules. Each unmanned drive unit with two cleaning modules includes a first, bifurcated cleaning element that includes a rotary brush that is arranged to avoid contact with fiducial markings in the material handling grid, and a second cleaning element that includes a stationary brush that is arranged to clean the fiducial markings without causing damage or occlusion. The inventory management system can be operated under the control of at least one processor and at least one tangible memory device storing non-transitory instructions in order to select locations to send the drive units with cleaning modules, cause the drive units with cleaning modules to navigate to the designated regions, and cause the drive units with cleaning modules to perform cleaning operations at those regions. The cleaning processes can be conducted without disrupting the general operation of inventory-handling drive units nearby.

Figure 1:
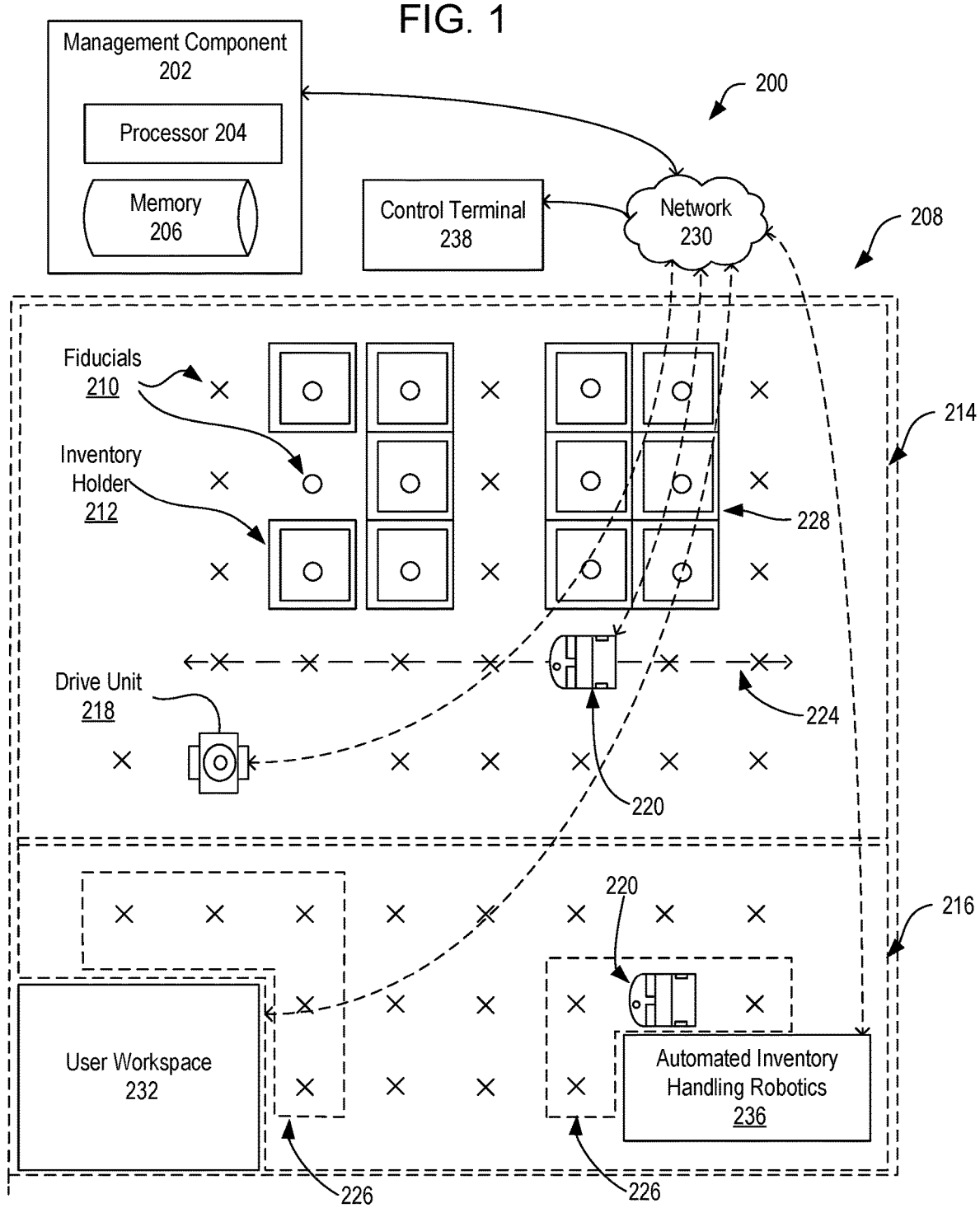
FIG. 1 is a simplified schematic diagram illustrating an example inventory system, in accordance with some embodiments.

FIG. 1 illustrates an example inventory management system 200 that utilizes a material handling grid 208 or workspace, in an inventory facility, in accordance with some embodiments of the present disclosure. Aspects of the system 200 are directed by a controller or management component 202, which includes a processor and memory 204, 206. Specific attributes of the management component 202, associated modules, and processes are discussed below with greater detail with reference to FIGS. 7-8 and 11. The management component 202 can communicate with other system components via a network 230, such as a wireless network.

The system 200 can be used to manage inventory items in the context of the material handling grid 208, which can include multiple working regions. In some embodiments the material handling grid 208 may be subdivided according to one or more storage regions 214 predominantly used for storing inventory holders 212, and one or more working regions 216 used predominantly for material handling, sorting, inbound and outbound processing, or comparable tasks. The material handling grid 208 may be defined by the physical space in which the inventory and inventory holders 212 rest, and on which inventory-handling drive units 218 operate in order to move and store inventory within the inventory facility. A virtual representation of the workspace can be maintained by the management component 202 in order to facilitate control over various resources of the workspace, including the drive units 218 moving therein. Control over the inventory system 200, including control to manage drive unit tasks for both inventory-handling drive units and for drive units with cleaning modules, and even to update aspects of the virtual representation of the material handling grid (e.g., access restrictions), can be conducted by a user at one or more control terminals 238, which can communicate with the management component 202 via the network 230, and which may be on-site, remote, or connected with one or more user workspaces 232.

In some embodiments, the material handling grid 208 can include a laid-out set of grid positions, which may include machine-readable fiducial markings 210. Generally, each grid position will be uniform and sized to accommodate inventory system resources, such as but not limited to drive units 218 and inventory holders 212 as shown. Other resources can include automated inventory handling robotics 236, such as automated sorting equipment, lifts, carriers such as shuttles and the like; or a user workspace 232, which may be delimited by grid positions and include facilities for assisting user tasks. The physical grid positions correspond to grid positions in the virtual representation of the workspace, so that the management component 202 can track positions and actions of resources as they move about the material handling grid 208. The fiducial markings 210 can include machine-readable indicia for use by drive units 218, or other system resources, to identify their current position in the inventory system. In some embodiments, resources in the material handling grid 208 can use the fiducial markings 210 as guides for transiting within the workspace, as will be described in greater detail with reference to FIG. 2 below.

In general, the fiducial markings 210 define positions in the material handling grid 208, while the virtual representation of the workspace can designate certain of those positions for tasks. The positions in the material handling grid 208 are defined not only by location, but also by a set of rules for each location. For example, subsets of positions in the material handling grid 208 may be designated for transportation of inventory holders 212 by drive units 218, as denoted by 'X' markings, while other subsets of the positions may be designated for storage of inventory holders, as denoted by 'O' markings. The arrangement of these designations in the virtual representation of the workspace will tend to create systems of pathways 226, i.e., adjacent fiducial locations suitable for transit of drive units 218 within the inventory system. Such paths 226 designated for transportation of inventory holders can be aligned parallel to blocks of storage units 228 to provide direct paths for the removal or return of inventory holders between storage regions and stations within and around the material handling grid 208, while regions designated for storage of inventory holders can provide additional paths for the outbound transit of empty drive units 218 to retrieve inventory holders, and the like.

The system 200 can also generate designations for specific regions, e.g., regions for accommodating automated inventory handling robotics 236. Automated inventory handling robotics stations 236 may designate specific locations for receiving drive units 218, either within or adjacent to the station; and may restrict access by drive units to certain locations, e.g., some locations may be removed as drive-unit accessible locations due to overlap with some physical structure of the station; or some locations may be height-restricted, thus allowing clearance therethrough by empty drive units or drive units carrying only certain forms of inventory holders and not others. Inventory handling robotics stations 236 may be associated with queues 226, i.e. regions preferentially set as one-way navigable space for drive units 218 to transit in order to allow the automated inventory handling robotics stations to interact with transported inventory items.

Also by way of example, user workspaces 232 may be defined with respect to the material handling grid 208, e.g. as regions that are either removed from the material handling grid 208 to prevent access by drive units 218, or designated as inaccessible by drive units. Similarly, queues 226 may also be associated with user workspaces 232 to facilitate access to drive units 218 and inventory holders 212 transported therethrough. In general, the flow of drive units 218 through spaces within the inventory system 200 may be managed by the use of rules associated with positions, as defined by the fiducial markings 210, that create specific traffic patterns to manage the volume of movement. These traffic patterns drive the overall usage of each individual position in the material handling grid 208 and can be used as one predictor of wear or the likelihood of debris occurring at those positions.

Debris in the material handling grid 208 generally refers to fine dust, e.g. cement dust or the like, but may also include other particulates and spilled substances. When debris is present in the material handling grid 208, the predominant impact on drive unit efficacy is the occurrence of "slip," where drive units 218 can temporarily lose traction. "Slip errors," in which drive units may miss or pass fiducial markings 210, can result in lost efficiency, as the drive units then have to reorient to the grid 208 before performing new tasks. Other impacts of debris in the material handling grid can include occluded fiducial markings 210, where dust or debris prevents the sensors of drive units 218 from accurately detecting their location based on the fiducial markings.

Unmanned drive units with cleaning modules 220 can be deployed by the inventory system 200 for mitigating debris in the material handling grid 208. Such unmanned drive units with cleaning modules 220 can be preferentially deployed to specified locations or paths in the inventory system 200 based on a variety of considerations. In at least one embodiment, grid positions in the material handling grid 208, as defined by the fiducial markings 210, can be prioritized for cleaning according to usage (e.g. likelihood of debris being present due to high usage, or likelihood that debris would cause a reduction in efficiency), according to indicators of debris (e.g., slippage reported by drive units 218, difficulty locating fiducial markings 210 reported by drive units, etc.), or both. In some embodiments, priority for cleaning can be weighted based on the designation of specific grid positions, e.g. fiducial locations 210 designated for storage (e.g. storage blocks 228) which see little traffic may be low priority, while adjacent paths 226 designated for regular traffic may be high priority. Priority for cleaning may also be based on regional designations, e.g., portions of the material handling grid 208 designated primarily for storage (e.g. storage region 214) may have a lower cleaning priority, while portions of the material handling grid designated primarily as working areas (e.g. sorting/working region 216) may be high priority. Specific grid positions may also be designated high priority according to special designations, e.g., queue locations 226, which are generally adjacent or nearby to user workspaces 232 and automated inventory handling robotics stations 236, may be designated high priority, because such locations generally see near-constant drive unit 218 traffic during operating periods, and because such locations may be more prone to generating debris than other locations.

Unmanned drive units with cleaning modules 220 and inventory-handling drive units 218 as described above with reference to FIG. 1 can utilize the same or similar navigation and operating principles as drive units 20 (FIG. 2), which are described in detail in the context of the inventory system 10 in FIGS. 2-5. Specific mechanical features of exemplary unmanned drive units with cleaning modules 220 are described below with reference to FIGS. 7-10. Generally, unmanned drive units with cleaning modules 220 are sized according to the dimensions of the material handling grid 208 to optimize their ability to navigate at similar rates and around similar obstacles to drive units 218. Unmanned drive units with cleaning modules 220 are generally capable of tunneling underneath inventory holders 212 and some other stationary equipment, can generally use the same charging stations as those used by drive units, and can navigate around objects or people in a similar manner using onboard sensors, system resources, and fiducial-based navigation.

Figure 2:
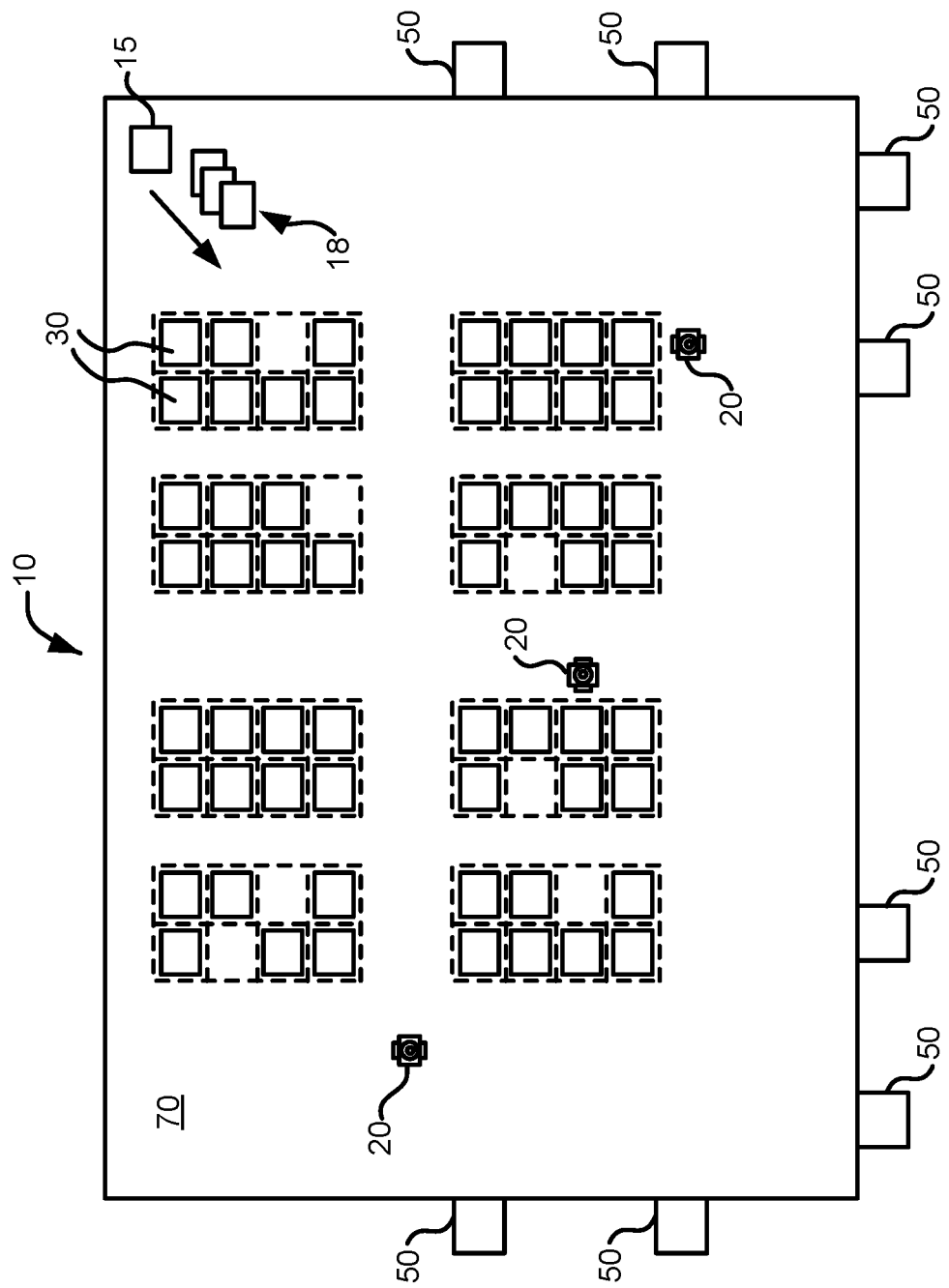
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
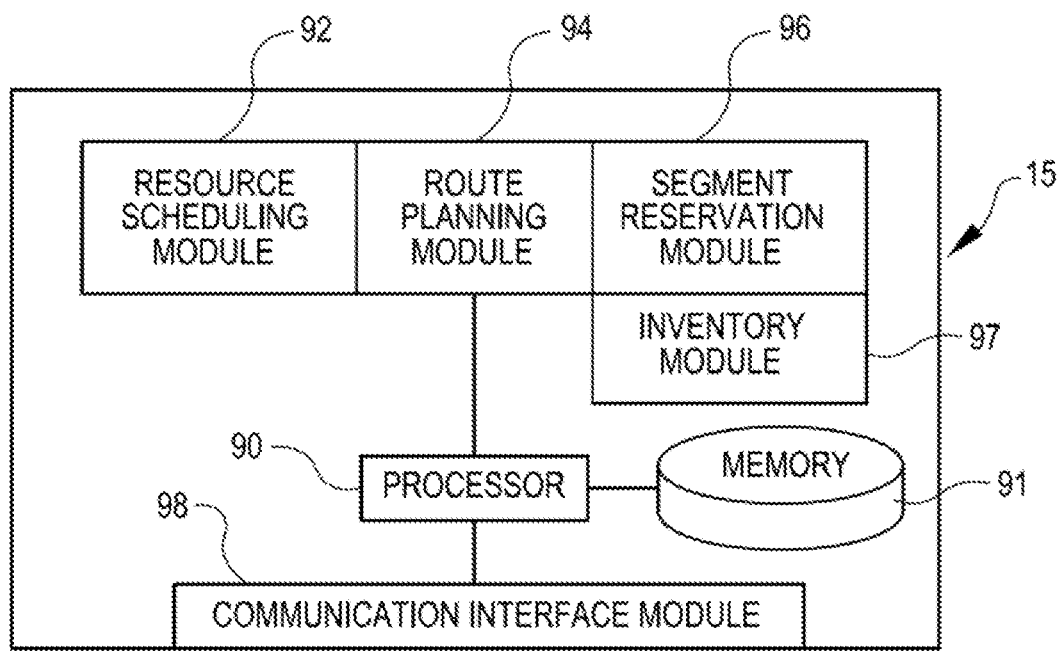
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10.

Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
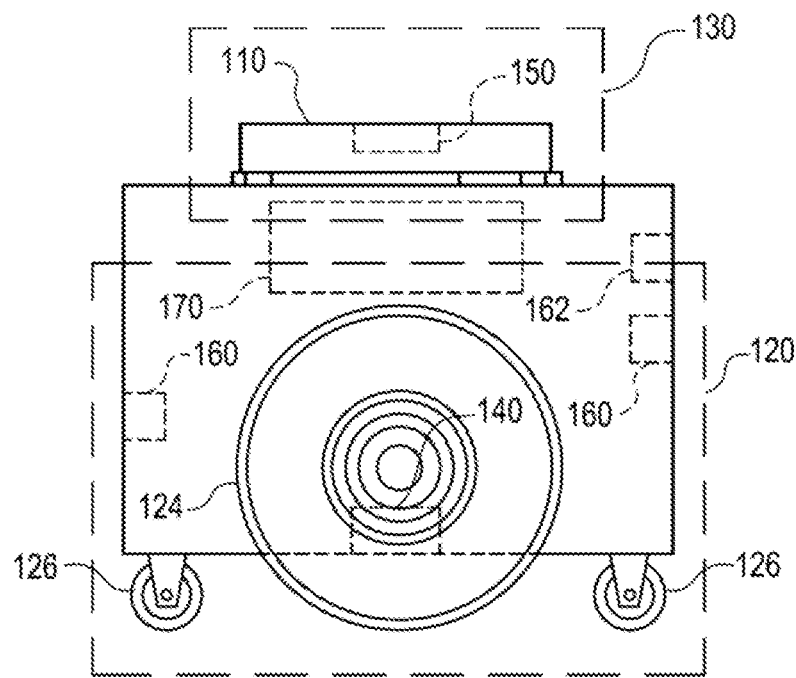
FIGS. 4 and 5 illustrate in greater detail an example mobile drive unit that may be utilized in particular embodiments of the inventory system shown in FIG. 2.
Figure 5:
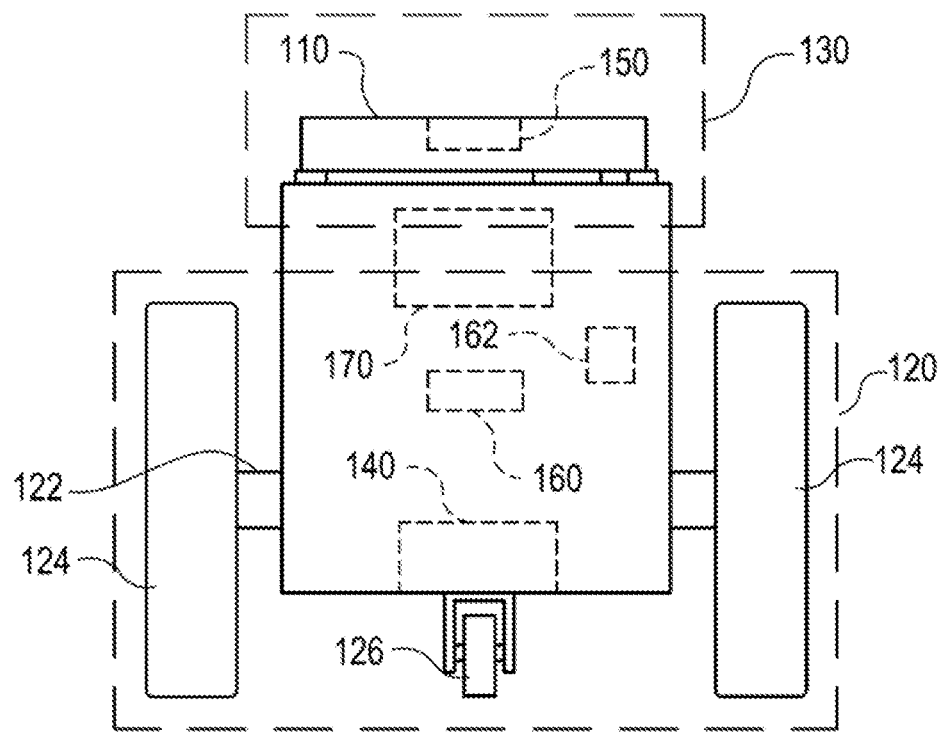

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
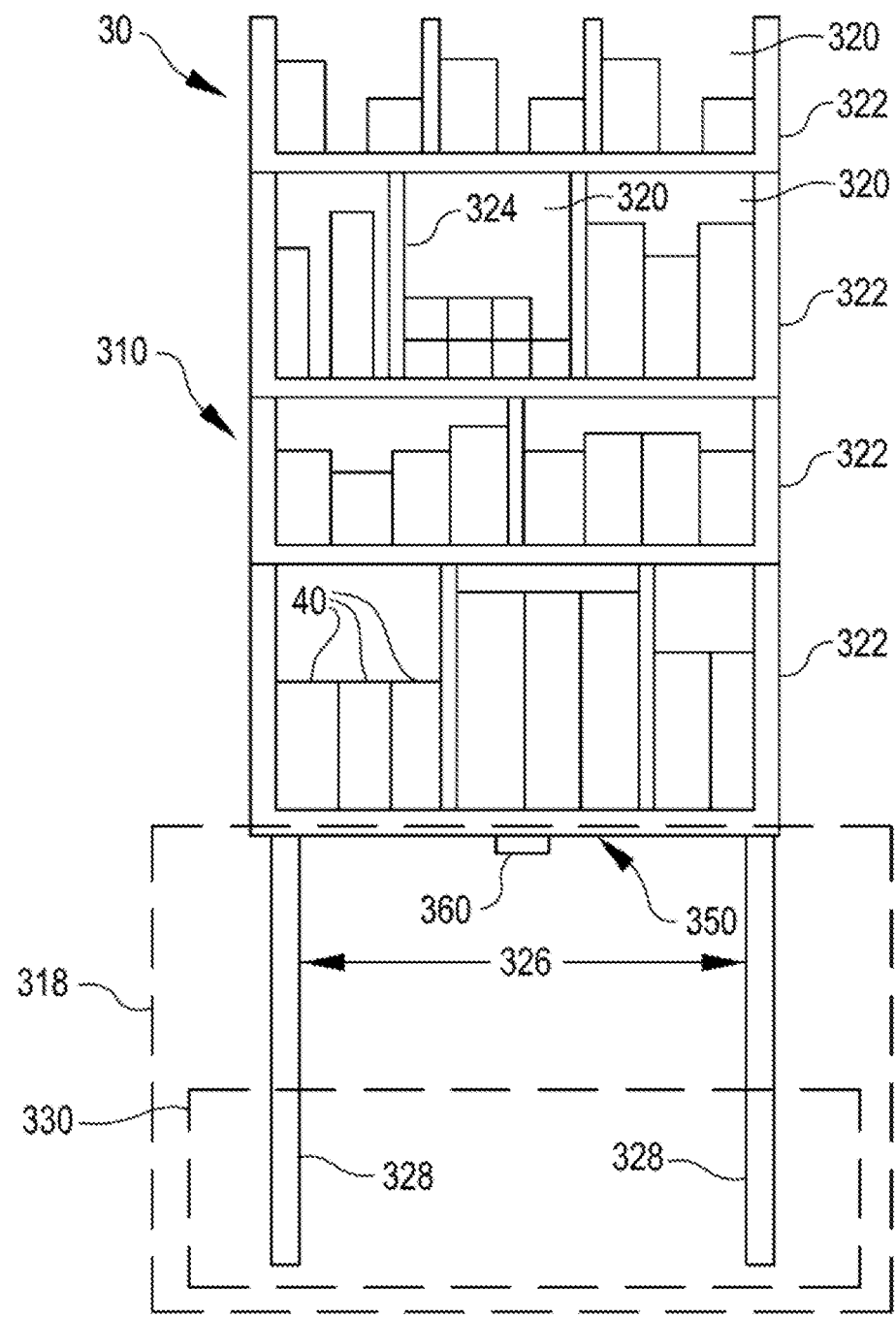
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to inventory systems that can employ inventory holders, drive units for moving the inventory holders, and robotic systems for handling inventory in conjunction with unmanned drive units with cleaning modules 220 (FIG. 1) that maintain the environment of the workspace on an as-needed basis without requiring human intervention. Details of specific embodiments of unmanned drive units with cleaning modules are described below with reference to FIGS. 7-10.

Figure 7:
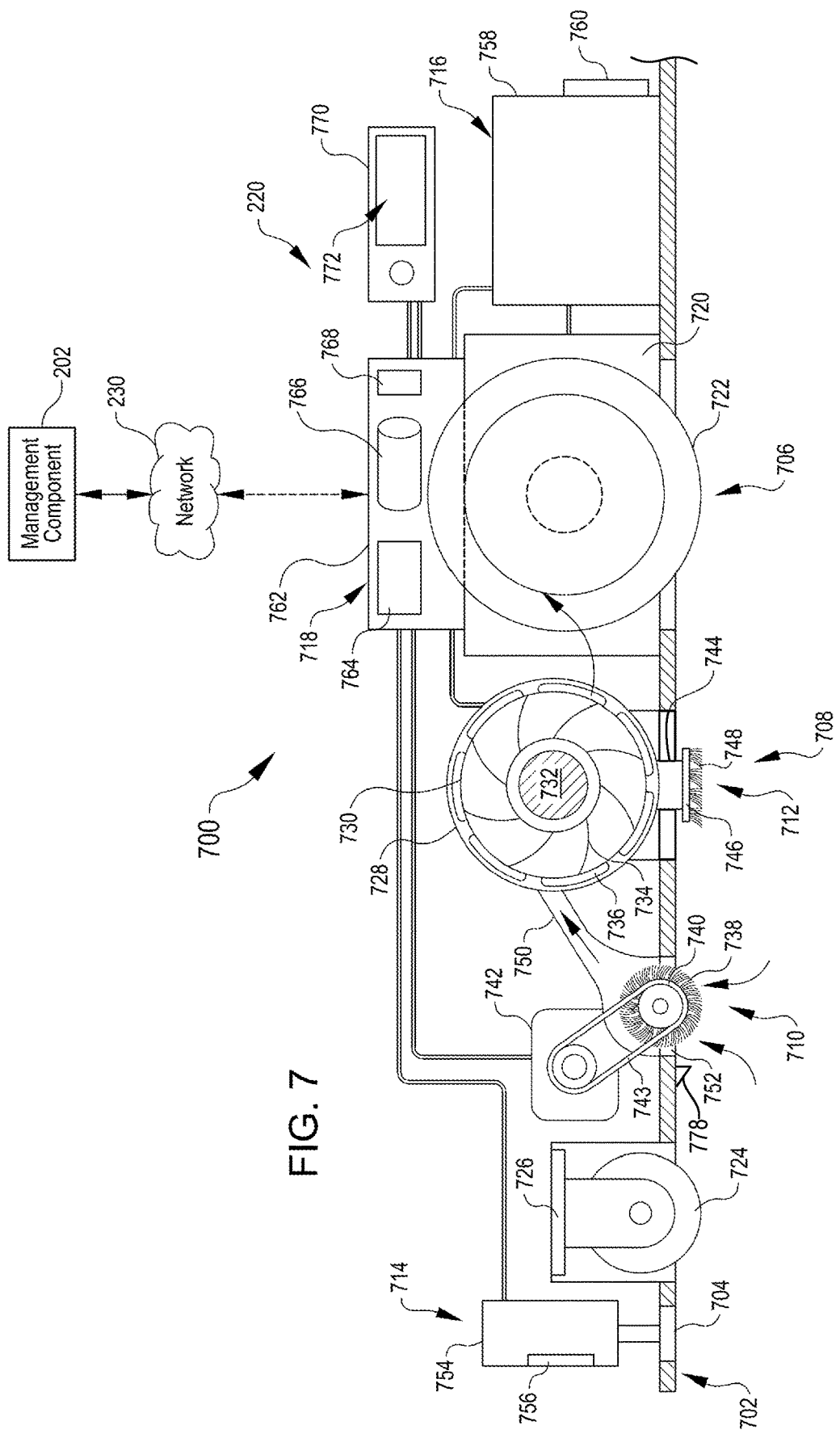
FIG. 7 is a partial side section view illustrating an example drive unit with a cleaning module that can be used in the inventory system of FIG. 1.

FIG. 7 is a partial side section view illustrating an example drive unit 220 with a cleaning module that can be used in conjunction with an inventory system 700 like the inventory system 200 of FIG. 1. The specific orientations and locations of features on the drive unit 220 can vary unless specifically indicated otherwise. The drive unit 220 includes a body 702 supported by a supported plate or frame 704. The frame 704 is supported by a drive module 706 and at least one pivoting wheel 724 that allow the drive unit 220 to navigate and to turn in place. The frame further supports a blower module 708 that generates suction to clean debris in conjunction with a main cleaning module 710 and a fiducial cleaning module 712. The main cleaning module 710 is bifurcated and generally includes at least one rotating brush 738, while the fiducial cleaning module 712 includes a stationary brush 748 suitable for gently cleaning fiducial markings (210, FIG. 1) without causing damage or occlusion. The unmanned drive unit 220 can navigate based on fiducial markings 210 in combination with sensor-based navigation relying on a detection module 714. The unmanned drive unit 220 can operate autonomously or semi-autonomously while powered by a portable energy storage module 716 and under the partial or fully autonomous direct control of an onboard control module 718, in conjunction with instructions from a management component 202 via network 230.

The drive module 706 includes one or more motors 720 connected with at least two drive wheels 722. In at least one embodiment, the drive wheels 722 can be turned independently to cause the unmanned drive unit 220 to turn in place. Further support for the drive unit 220 can be provided by a rotating wheel 724, e.g. a caster or comparable freely-rotating wheel. The rotating wheel 724 can be attached to a rotating mount 726 positioned above the frame 704 so that the rotating wheel extends through the frame in order to retain an effectively low profile. Similarly, the drive wheels 722 can extend around the side of, or partly through, the frame 704 in order for the drive unit 220 to retain a low profile.

The blower module 708 is arranged to generate high-volume airflow beneath the drive unit 220 in order to pull up dust and other debris. The blower module 708 includes several features that differ significantly from convention vacuum-based cleaning tools. For example, conventional devices employ high differential pressures (i.e., small blowers operating at very high pressures) passed through small cross-sectional areas to generate high airspeeds where the vacuums interface with a surface to be cleaned. Such devices are ideal for picking up tangible objects, but less effective at retaining the fine dust as typically encountered in an inventory system. In contrast, the blower module 708 described herein includes features directed to very high airflow (i.e., multiple blowers 730, large duct openings 752) that are specialized to the task of retaining fine particles in the range of about 3 μm. The blower module 708 generally includes a debris container 720 mounted to the frame 704, with a blower 730 mounted to each end of the debris container. Each blower 730 includes an impeller 734 mounted therein for generating negative pressure in the debris container 720. Filtered air is removed from the debris container 720 by the action of the impeller 734 through an outlet 732 from the debris container, and forced outward through a blower outlet 736 back into the external environment. Specific features of the blower module 708 are described in further detail below with reference to FIGS. 9 and 10.

The main cleaning module 710 includes at least one rotating brush 738 positioned in an opening 752 of a main cleaning duct 750. This main cleaning duct 750 is connected with the blower module 708 so that the negative pressure in the debris container 728 causes air to rapidly enter through the opening 752 around the rotating brush 738, to entrain debris and other particulates. Like a convention vacuum, the main cleaning module 710 can agitate debris using the rotating brush 738 and entrain the debris using suction. Unlike a conventional vacuum, however, the main cleaning module 710 is arranged to generate significantly more volume throughput of air at the cost of lower speed in order to preferentially target small particulates (i.e., dust on the order of about 3 μm) for cleaning. This construction differs significantly from convention vacuum design, which typically employs very high pressure differences ($\Delta P$) to recruit high airspeeds for lifting larger particles. The rotating brush 738 is configured to rotate counter to a direction of travel of the drive unit 220, e.g. clockwise as shown in FIG. 7, such that particles not immediately retained by the drive unit are pushed forward by the brush. This counter rotation promotes retention of larger particles (e.g. nails, washers, and other physical objects) and improves the efficiency of small particle retention.

High pickup rates of small particles were achieved by increasing the volumetric rate of airflow and adjusting a ratio of the cross section of the main cleaning duct 750 and duct entrance 752 with respect to the flow rate of air driven by the blower module 708. High airflow was achieved in part by using dual centrifugal fans, using a main cleaning duct entrance 752 with a high cross sectional area, and arranging the main cleaning duct 750 at an angle with respect to the substantially cylindrical debris container 728 to create a vortex within the debris container. In at least one embodiment, the resulting air velocity at the duct entrance 752 is at least 1.6 m/s. Preferably, the air velocity at the duct entrance can vary from about 2 m/s to about 6 m/s. In some embodiments, the air velocity at the duct entrance may be tuned to at least 6 m/s with a clean filter to ensure a resulting air velocity of at least 1.6, or in some cases at least 2.0 m/s, as filter wear and captured debris accumulate and decrease the air velocity achievable by the blower module 708. The high flow rates generated at the main cleaning duct entrance 752 encourage high efficiency at retaining small particles, particularly in the 3µ range typical of such particulates as cement and cardboard dust most common to inventory systems. In some embodiments, the rate of efficiency for picking up such small particles is at least 55%, or at least 60%, or at least 70%, for each pass over the particles.

In accordance with at least one embodiment, the main cleaning module 710 including the rotating brush (or brushes) 738 spans an active region across the entire width of the unmanned drive unit 220 including portion including the drive wheels 722, except for a bifurcation aligned with the fiducial cleaning module 712. The relationship between the main cleaning module 710 and fiducial cleaning module 712 is described in more detail with respect to FIG. 8. Across the active region, the rotating brush or brushes 738 generate friction against the floor to agitate and lift dust and other debris. The brush 738 can generate suitable agitation at brush speeds from about 3000 bpm (beats or brush touches per minute). The rotating brush 730 can be independently powered, in some embodiments, by a brush motor 742 connected with a brush rotary connection 740 via, e.g., a belt 743 or other suitable linkage. In some alternative embodiments, the rotating brush 730 can be powered by differential air pressure across the duct 750. The main cleaning module 710 includes a gap 780 (FIG. 8) across which the rotating brush 738 or brushes do not contact the floor. This gap 780 is sized to accommodate fiducial markings 210 (FIG. 1) to prevent damage to the fiducial markings by the rotating brush.

The fiducial cleaning module 712 is arranged beneath the frame 704 and typically positioned along a centerline of the unmanned drive unit 220. The fiducial cleaning module 712 includes a fiducial cleaner duct 744 that extends into the debris container 728 in order to convey suction to the fiducial cleaner head 746, where the module opens to the environment. The fiducial cleaner head 746 includes a fiducial cleaner brush 748 which interacts with the floor across the fiducial markings 210 in order to gently clean the markings without causing damage. The focused suction directed along this path by the fiducial cleaning module 712 compensates for the absence of agitating brushes in order to effectively clean along a narrow path that includes the fiducial markings 210. Agitation is not required at the fiducial cleaning module, as high airflow velocity at the fiducial cleaning head (i.e. high dynamic pressure) aids in the removal of debris therefrom. In at least one embodiment, the fiducial cleaner brush 748 does not surround the entire fiducial cleaner head 746, instead including an open portion 749 (FIG. 9) facing the anterior end of the drive unit 220. The fiducial cleaner head 746 is sized to approximately match the gap 780 of the main cleaning module 710, though the fiducial cleaner head 746 may be slightly larger than the gap or slightly smaller. The fiducial cleaner head 746 will generally span at least a width of the fiducial markings 210, typically including an additional tolerance (e.g., an addition 1.25 cm to 2.5 cm per side, or in some cases from 2.5 cm to 5 cm per side) to account for minor misalignment. For example, in some embodiments, the fiducial cleaner head 746 is sized for accommodating fiducial markings having a minimum size of about 2.1 cm to 3 cm (i.e., about 2.5 cm). In some embodiments, the fiducial cleaner head is 2.5-5 cm in width, or in some cases from about 5-7.5 cm, or in some cases from about 7.5 cm to 10 cm. The fiducial cleaner head can have a narrower depth than width in order to increase airspeed therethrough, e.g. having a width to depth ratio ranging of about 5:2 (e.g. about 10 cm to 4 cm, or similar). In accordance with at least one embodiment, the airflow rate across the fiducial cleaner head can vary between about 50 m/s to about 200 m/s, depending on the load on the filters of the blower module 708.

The unmanned drive unit 220 can also include a detection module 714 including at least one sensor unit 754 housing a sensing element 756. In one embodiment, a sensor unit 754 is arranged at a periphery of the drive unit 220 in order to sense adjacent objects, people, other drive units, or the like. Suitable sensing elements 756 for achieving such detection include optical detectors (e.g., cameras in conjunction with image recognition software), infrared detectors, acoustic or sonic detectors, and the like. Additional sensing elements 756 can be positioned at any suitable position along the periphery of the drive unit 220 (e.g., front, sides, rear) to detect adjacent obstacles, can include downward-facing sensing elements to scan fiducial markings 210, and/or can include debris sensors, such as downward-directed sonic sensors (e.g., piezo-actuated sensors) for detecting debris such as dust. In some embodiments, the drive unit 220 can start a cleaning operation based on a preventative maintenance cycle, wherein the controlling system directs the drive unit to a path on which debris may be expected. While performing the preventative maintenance cycle, the drive unit can sense debris in its path to initiate the cleaning operation.

Power supplied to the unmanned drive unit 220 may be stored in an onboard energy storage module 716, which includes one or more batteries 758 and charging elements 760. The unmanned drive unit 220 may be operable to connect with the same charging stations employed by other autonomous elements of an inventory management system, like the drive units 218 of inventory management system 200 (FIG. 1). The unmanned drive unit 220 can be partially autonomous, taking general instructions (e.g. destinations, cleaning instructions) from management component 202 via the network 230; can be controlled directly by commands from the management component; or can operate in a combination of both capacities. Generally, the unmanned drive unit 220 can store and execute instructions at an onboard control module 718 which includes a housing 762 including onboard processing 764, memory 766, and a networking module 768 for sending and receiving data, including instructions, to and from the management component 202. The onboard control module 718 can communicate instructions to the above-described components of the drive unit 220. The drive unit 220 can also include onboard user input/output capability in a user I/O module 770, which can include a control and/or indicator element 772 for communicating information to a user and/or for receiving commands from a user.

Figure 8:
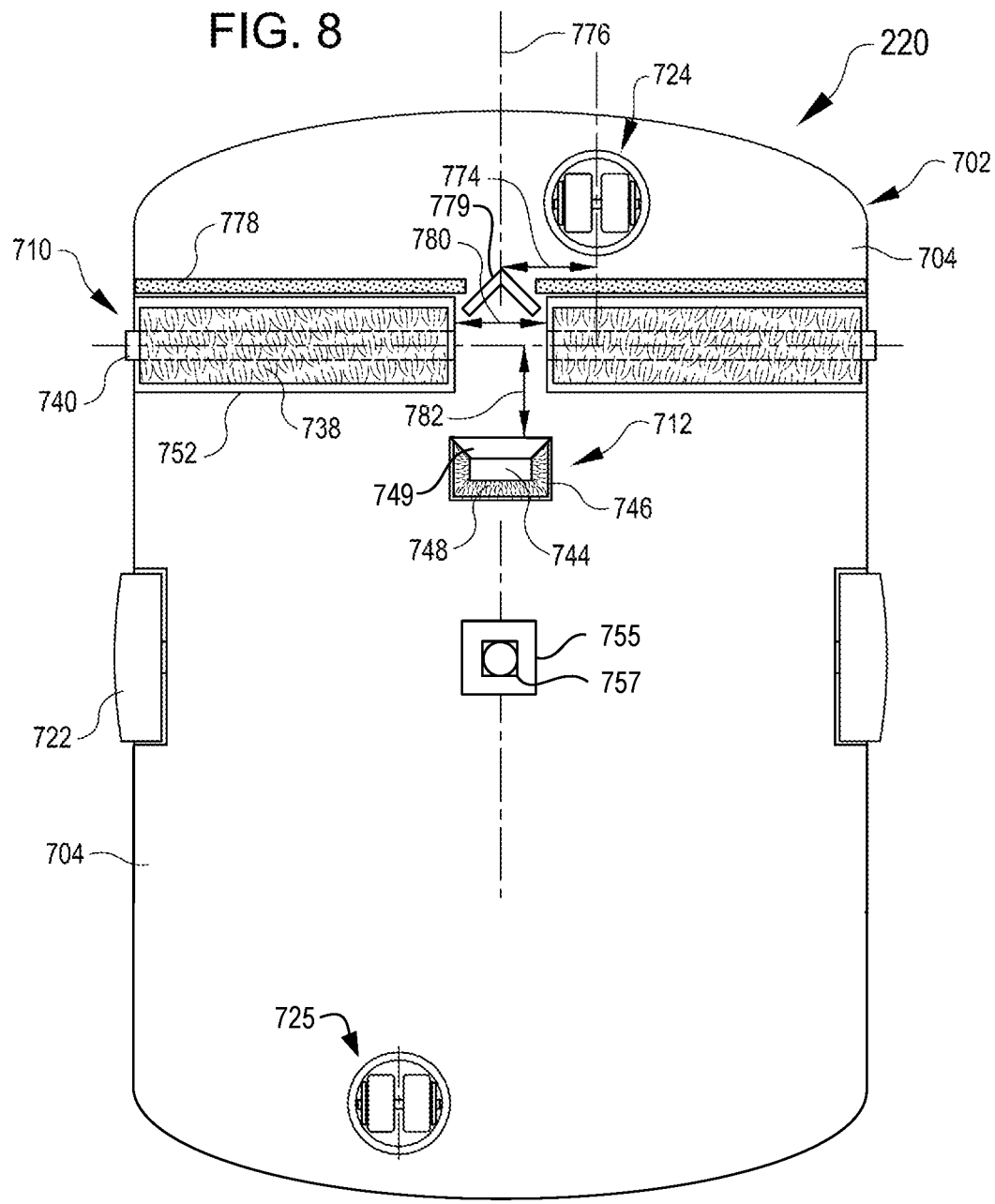
FIG. 8 is a bottom view of the example drive unit with a cleaning module shown in FIG. 7.

FIG. 8 is a bottom view of the example drive unit with a cleaning module 220 shown in FIG. 7, showing the relative positioning and orientation of the main cleaning module 710 and fiducial cleaning module 712. In at least on embodiment, the main cleaning module 710 includes a bifurcated main brush 738. As described above, the main cleaning module 710 includes a gap 780 across which the rotating brush 738 does not contact the floor. This gap 780 is sized to accommodate fiducial markings 210 (FIG. 1) and is generally aligned with a centerline 776 of the drive unit 220. The rotating wheel assembly 724 can also be offset 776 from the centerline 776 in order to reduce impact on the fiducial markings. A second rotating wheel assembly 725 can be positioned opposite the first rotating wheel assembly 724 to support the drive unit 220. In some embodiments, the gap 780 is formed by entirely bifurcating the main cleaning module 710 into two aligned but separate brushes 738, each with their own duct openings 752. In some alternative embodiments, the gap 780 is formed by utilizing a single axis, with separate bristle-containing regions separated by the gap 780. The brush or brushes 738 can be straight brushes or helical brushes.

In at least one embodiment, a span of the rotating brush or brushes 738 and the main duct opening 752 extends at least to the outer edges of the wheels 722, so that the entirety of the wheel track is cleaned by the main cleaning module 710. These components of the main cleaning module 710 may also extend beyond the tracks of the drive wheels 722. In the context of an inventory system, such as system 200 (FIG. 1), the drive unit 220 can be adapted to have the same drive wheel track as drive units 218, or even a broader drive wheel track, so that a cleaning operation conducted by such drive units is effective at cleaning an entirety of the drive wheel track of the drive units. In some embodiments, the drive unit 220 can be adapted from a frame of a drive unit 218, such that drive units with cleaning modules and drive units without have substantially the same dimensions and some of the same capabilities, including but not limited to: turning in place, tunneling under obstacles, and fiducial-based navigation.

Though fiducial markings 210 can vary in size between inventory management systems, typical markings are approximately 2.5 cm on a side. In various embodiments, the gap 780 exceeds the size of the fiducial markings, typically with a small margin of error, e.g., about 1.25 cm to 2.5 cm margin on each side. In one example, the gap 780 is about 5 cm wide compared to a fiducial marking size of about 2.5 cm. A fiducial reader module 755 including a fiducial reading sensor 757 can be positioned centrally to the drive unit 220 and positioned underneath to sense the fiducial markings 210 as the drive unit traverses over them. This fiducial reader module 755 will typically be located in line with and anterior to the fiducial cleaning module 712.

According to some embodiments, the unmanned drive unit with a cleaning module 220 can also include a pre-brush element 778 positioned beneath the frame 704 anterior to the main cleaning module 710. The pre-brush element includes a plurality of lowered teeth that extend away from a bottom of the drive unit frame 704 proximate to the rotating brush 738. In specific embodiments, the pre-brush element 778 includes a plurality of anterior-pointing triangular elements that readily allow small objects to pass through the pre-brush element as the drive unit 220 moves forward, but tend to block ejecta from passing forward from the rotating brush. This arrangement generally improves small object pickup by the main cleaning module 710. A chevron-shaped or triangular pre-brush element 779 can be positioned centrally and projecting downward from the frame 704 to divert large objects from a path of the fiducial cleaning module 712 into the main cleaning module 710.

Figure 9:
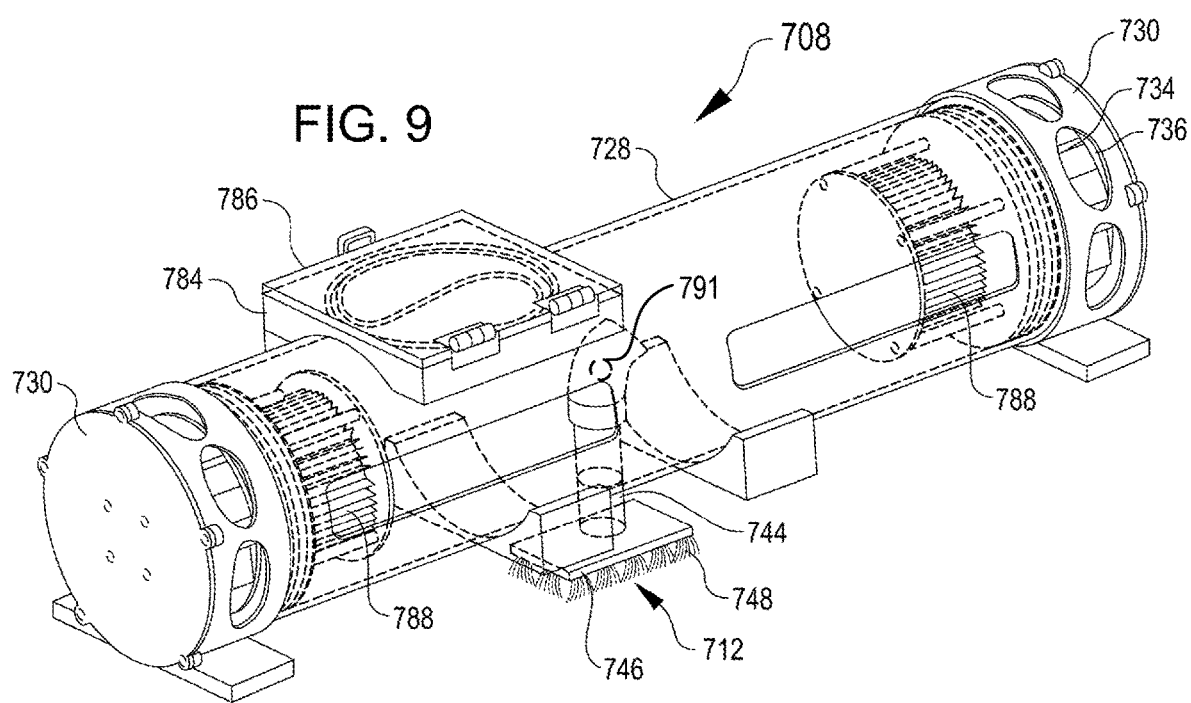
FIG. 9 is a perspective view showing a blower assembly for use with the drive unit with a cleaning module of FIGS. 7 and 8.

FIG. 9 is a perspective view showing the blower module 708 for use with the drive unit with a cleaning module 220 of FIGS. 7 and 8. The blower module 708, as shown, includes the cylindrical or substantially cylindrical debris container 728 that defines a cylindrical interior cavity. A pair of blowers 730 cap both ends of the debris container 728, with blower inlets 732 (FIG. 7) covered by filters 788 inside the interior cavity, and blower outlets 736 exposed to the exterior environment. In operations, the blowers 730 create a pressure differential by pulling air from the interior of the debris container 728 through the filters 788 by action of the impellers 734. The pressure differential drives airflow into the main duct 750 (FIG. 7), as well as into the fiducial cleaner duct 744. The fiducial cleaner duct 744 extends into the debris container 728 toward the center of the debris container, where the pressure differential pulls air from the duct into the debris container. A debris level sensor 791 can be used to detect whether the debris container 728 is full. In some embodiments, the debris level sensor 791 can be placed inside the debris container (i.e., mounted to a surface within the debris container), or outside the debris container and configured to sense the level inside. One suitable debris level sensor can be an optical sensor for detecting a light level at a point in the debris container 728, where a "full" condition can be detected based on the light level falling below a threshold. However, other sensing means may be used for detecting whether a debris container is full.

Figure 10:
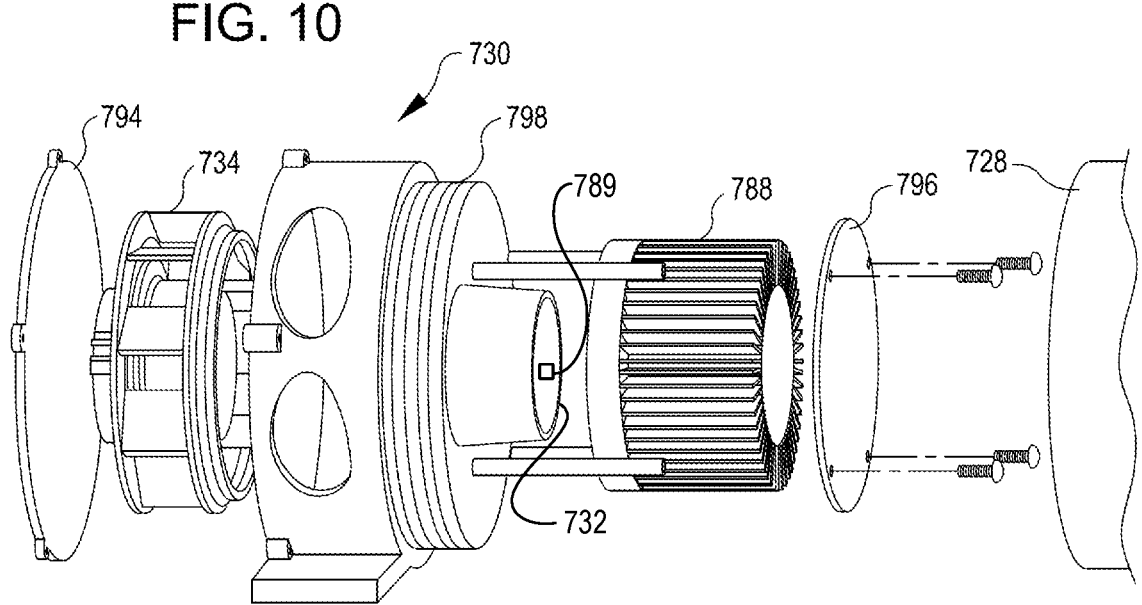
FIG. 10 is a perspective, exploded view showing a blower unit for use with the blower assembly of FIG. 9.

FIG. 10 is a perspective, exploded view showing a blower 730 for use with the blower module 708 of FIG. 9. The blower 730 includes a housing 798 containing the impeller 734 including a motor for spinning the impeller. At an exterior end of the housing 798, an outer end plate 794 is connected with the housing for retaining the impeller. At an interior end of the housing 708, a filter 788 is affixed over the blower inlet 732 for trapping debris, and secured with a filter end plate 796. The blower inlet 732 and filter 788 are contained within the debris container 728 when the blower module 708 is assembled. A flow rate sensor 789 can be positioned adjacent the filter 788 for determining a flow rate of air flow through the filter, and can be used to determine when the flow rate has fallen below a threshold. A low airflow condition can be indicative of a dirty filter or other mechanical failure associated with the blower 730.

According to various embodiments, unmanned drive units with cleaning modules as described above can be directed to navigate throughout a workspace associated with an inventory management system based on a material handling grid, such as the material handling grid 208 described with reference to FIG. 1. The movements (i.e. navigation) and actions (i.e., cleaning operations) of the drive units with cleaning modules can be controlled under the direction of an onboard management component physically connected with the drive unit 220 (e.g. control module 718, FIG. 7), a remote management component that communicates with the drive unit (e.g. management component 202, FIGS. 1 and 7), or a combination of both. Accordingly, various software modules, which may be distributed across any suitable number of individual servers, can be employed to control specific aspects of the operation of an unmanned drive unit 220. In some embodiments, drive units with cleaning modules are controlled in concert with the various robotics and autonomous drive units of an inventory management system, e.g. to prevent collisions, efficiently route drive units with cleaning modules around drive units or obstacles, and even interrupt drive unit tasks to facilitate cleaning operations.

Figure 11:
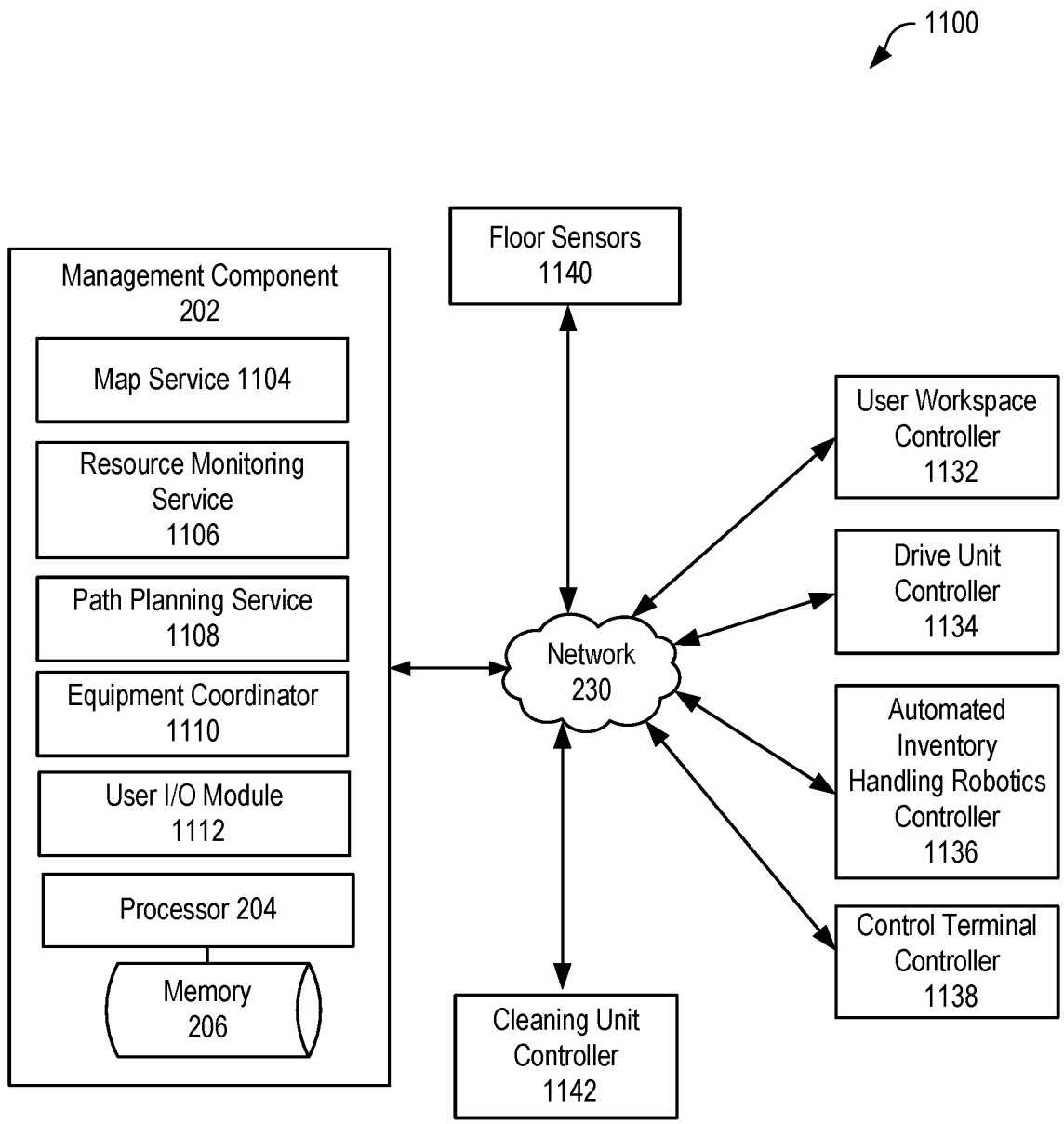
FIG. 11 is simplified block diagram illustrating a system for controlling the drive unit with a cleaning module of FIGS. 7 and 8 in an inventory system like the system of FIG. 1.

FIG. 11 is simplified block diagram illustrating an example system 1100 for controlling drive units with cleaning modules such as drive units 220 as described in FIGS. 7 and 8, in an inventory system like the system 200 of FIG. 1. The system 1100 may be operable to control any suitable number of unmanned drive units 220 within the inventory system. In some cases, the system 1100 can be configured to also control drive units 218 for transporting inventory holders 212 (FIG. 1) to control any suitable number of inventory system resources, (e.g., automated inventory handling robotics 236), as well as other system elements.

For example, the system 1100 includes a management component 202, as described above with reference to FIG. 1, including a processing module 204 and memory 206 operable to maintain any, or all of, or any suitable combination of the following modules. As discussed above, any suitable number of the following modules may also be distributed, e.g. in a cloud-based architecture. The management component 202 may communicate with any distributed components, or with controllers for physical components of the inventory system, via a network 230, which may be any suitable type of wired and/or wireless network.

Modules for managing operations in an exemplary inventory system include, but are not limited to: a map service 1104 for maintaining positions and status information of various fiducial locations in a material handling grid, a resource monitoring service 1106 for maintaining locations and status information concerning charging stations, repair stations, and/or storage locations for drive units with and without cleaning modules; a path planning service for calculating optimum routes for transit between a drive unit position and a destination location, e.g. a location to be cleaned, as well as to calculate routes for efficiently cleaning a location that spans multiple fiducial positions. Further modules can include an equipment coordinator 1110, which can be used to coordinate drive unit actions with drive unit actions, e.g. to perform coordinated actions such as pausing drive unit motion to allow a cleaning operation to progress or scheduling cleaning operations around drive unit tasks. A user I/O module can be used to allow users to communicate instructions to the system, and to communicate alerts and information to users.

The management component 202 and any associated modules can communicate, via the network 230, with various system components. For example, a floor sensor module 1140 can manage stationary or mobile sensors to detect debris and indicate locations of debris to the management component. Individual drive unit controllers 1142, i.e. onboard control modules of drive units, can also communicate with the management component 202 via this network. Various other aspects of the inventory management system 1100 that can communicate with the management component 202 include, but are not limited to, a user workspace controller 1132 that manages user workspaces, individual drive unit controllers 1134 that manage tasks for specific drive units, controllers for automated inventory handling robotics 1136 that control automated systems other than drive units, and a control terminal 1138 for receiving user commands and/or presenting alerts to users.

Figure 12:
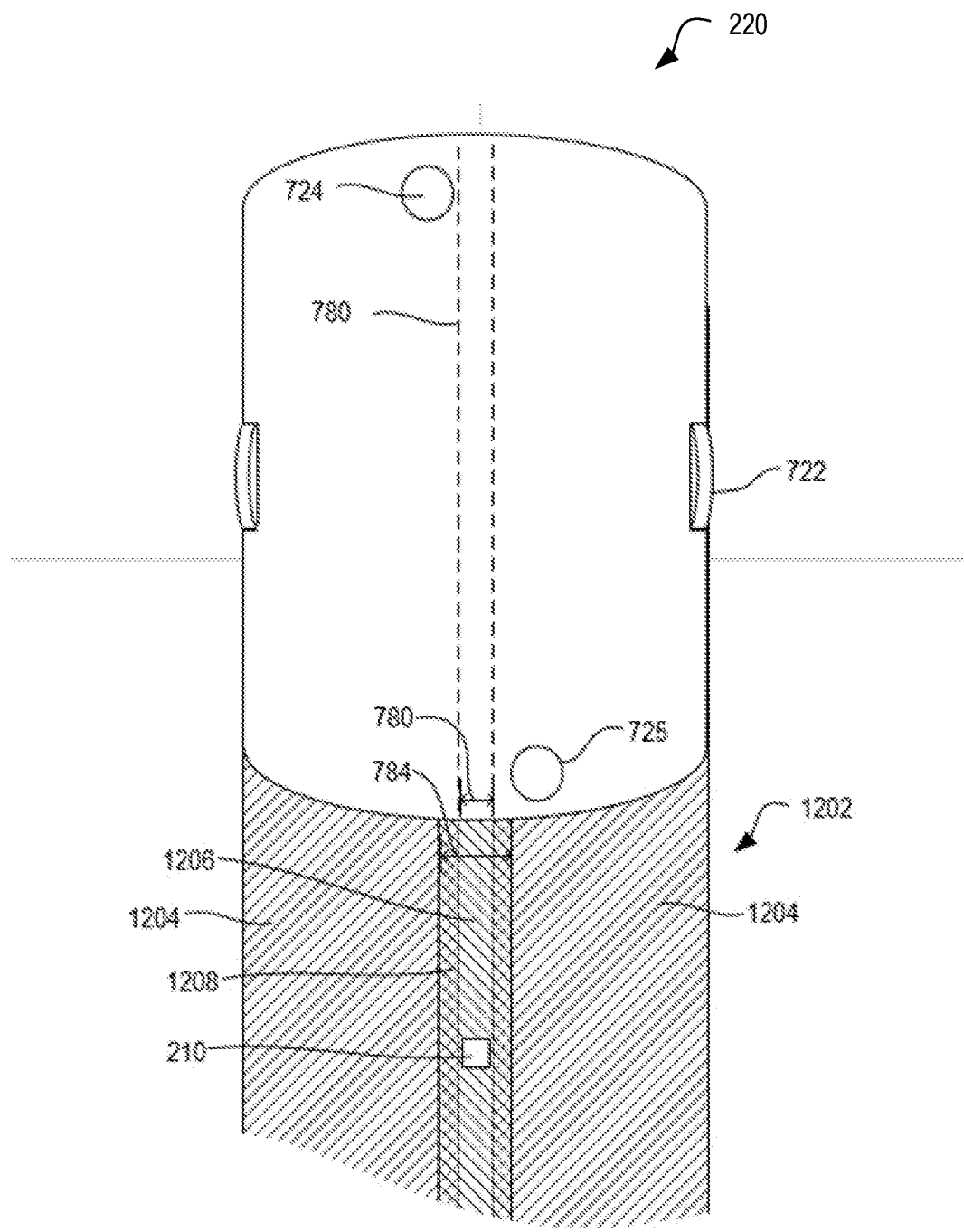
FIG. 12 is a simplified top view of the example drive unit with a cleaning module of FIGS. 7 and 8 showing the cleaning path of the example drive unit with a cleaning module with respect to a fiducial marking.

In operation, drive units with cleaning modules like the drive unit 220 shown in FIGS. 1, 7 and 8 can be directed by the system 1100 to perform cleaning tasks. In one example, the system 1100 can identify a location in the workspace that requires cleaning, and dispatch a drive unit with a cleaning module, which subsequently cleans the location along a cleaning path. FIG. 12 is a simplified top view of the example drive unit 220 of FIGS. 7 and 8 showing an example of a cleaning path 1202 with respect to a fiducial marking 210. As shown, the drive unit 220 cleans a region corresponding approximately to the width of the drive unit, which corresponds generally to a grid size of the material handling grid on which the drive unit operates. In some embodiments, the cleaning path 1202 can even exceed the width of the drive wheels 722. The cleaning path 1202 includes multiple portions, including a first portion 1204 covering a majority of the cleared area behind the drive unit 220. This first portion 1204 is cleaned by the combined action of the rotary brush 738 and suction generated at the main cleaning module 710 (FIG. 7). Because the drive unit 220 is centered along a grid formed by the fiducial markings 210, the fiducial markings fall within a gap 780 formed at the bifurcation of this first portion 1204 of the cleaning path 1202. A second portion 1206 of the cleaning path 1202 is cleaned by the gentler action of a stationary, fiducial cleaner brush 748 in combination with suction generated at the fiducial cleaning module 712. As the drive unit 220 proceeds along a cleaning path, which can include any suitable path that crosses debris or suspected debris, the drive unit 220 generally turns in place when navigating turns, so as to continue following the material handling grid 208 (FIG. 1) and to avoid impacting fiducial markings 210 with the rotary brush 738. In some embodiments, the fiducial brush is centered in both the width and length of the drive unit 220 so that the fiducial cleaning module 712 can clean fiducials along both straight paths and turns.

Figure 13:
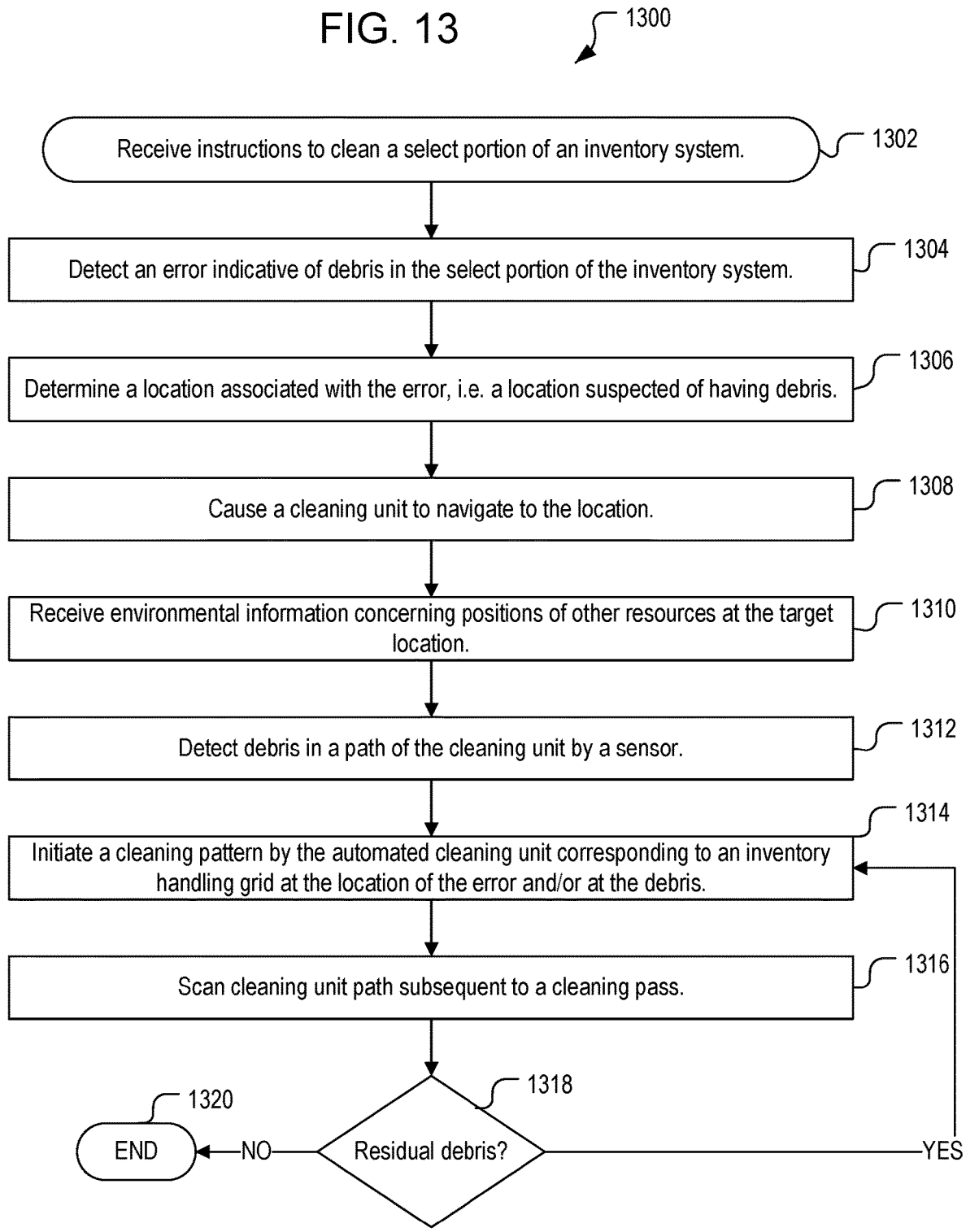
FIG. 13 illustrates a first example process for controlling a drive unit with a cleaning module, like the drive unit of FIGS. 7 and 8, to perform a cleaning operation in an inventory system.

FIG. 13 illustrates an example process 1300 for controlling a drive unit with a cleaning module, like the drive unit 220 of FIGS. 7 and 8, to perform a cleaning operation in an inventory management system. Some or all of the process 1300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an embodiment, the process 1300 includes receiving instructions to clean a select location or portion of an inventory system, e.g. a designated part of a workspace as defined by a material handling grid (act 1302). In some cases, the system can select portions for cleaning based on current information about the inventory system. In one example, the system can detect a slip error by a drive unit which may indicate a likelihood of debris at the drive unit's position in the inventory system (act 1304). In alternative embodiments, the system can detect debris automatically using stationary or mobile sensors positioned around the inventory system. In another example, the system can detect debris based on secondary indicators, such as failure of system elements to navigate properly. In some cases, the system can designate the selected portions for cleaning based on a schedule (e.g., cleaning busy portions of the inventory system during off hours, breaks, or at night), by a pre-planned maintenance calendar (e.g., zoned cleaning of low-traffic areas on a periodic basis), regular cleaning of high-traffic areas or areas with high debris deposition (e.g., regular cleaning cycles near HVAC outlets, queues, high-traffic pathways, etc.,) or other factors.

Once an error is detected, the system can determine the location of the error (e.g. the slip error) based on the location of the drive unit during the slip (act 1306). The system can then dispatch an unmanned drive unit with a cleaning module to the suspected location of the debris (act 1308). While navigating to the location and/or once arrived, the drive unit can use onboard sensors to receive information concerning the positions of local resources, drive units, and other obstacles adjacent the suspected debris (act 1310). In some embodiments, the drive unit can also, or alternatively, use onboard sensors to directly detect debris in its path (act 1312), which may better inform the system regarding the actual location of debris. The system can initiate a cleaning operation by the drive unit in which the drive unit runs its cleaning modules while traversing the location associated with the debris (act 1314). The specific cleaning path employed during the cleaning operation can vary depending on the severity of the debris discovered and the location of the debris. In one embodiment, the system can instruct the drive unit to scan its path subsequent to performing the cleaning pattern (act 1316) to determine whether there is detectable, residual debris in the path (act 1318). If so, the system can instruct the drive unit to repeat the cleaning pattern until no residual debris is detected (act 1320).

Figure 14:
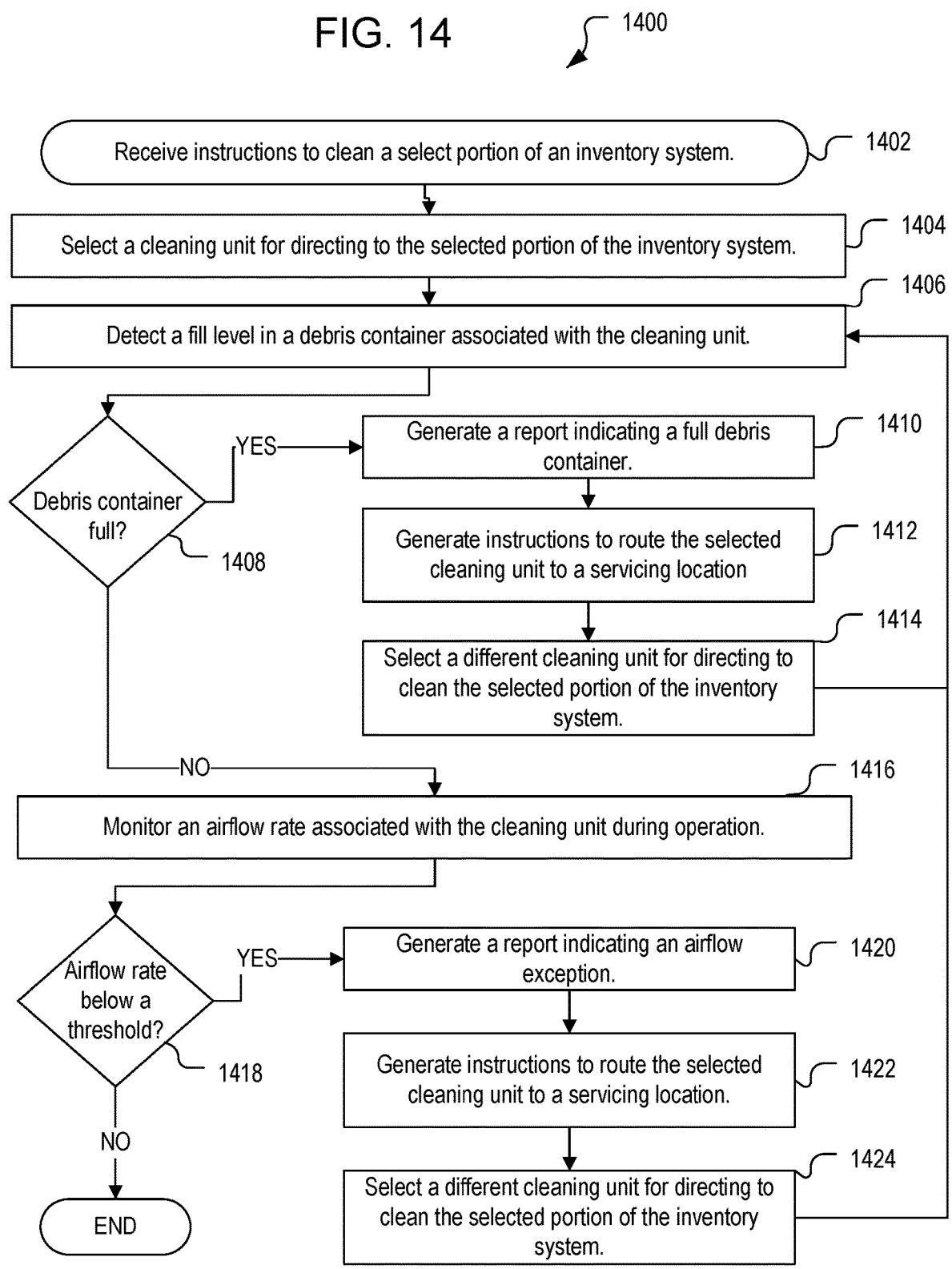
FIG. 14 illustrates a second example process for controlling a drive unit with a cleaning module, like the drive unit of FIGS. 7 and 8, to perform a cleaning operation in an inventory system.

Processes for cleaning portions of an inventory system, such as process 1300 (FIG. 13), can be conducted in concert with various maintenance processes conducted at each drive unit. For example, FIG. 14 illustrates an example process 1400 for controlling a drive unit with a cleaning module, like the drive unit 220 of FIGS. 7 and 8, to perform various self-assessment procedures during a cleaning operation in an inventory system. Process 1400 can be performed in conjunction with any other process described herein, e.g., process 1300 (FIG. 13). In an embodiment, the process 1400 includes receiving instructions to clean a select location or portion of an inventory system, e.g. a designated part of a workspace as defined by a material handling grid (act 1402). The system can then select a particular drive unit for directed to the selected portion of the inventory system (act 1404). This selection can be performed based on a variety of factors, a combination of factors, or a weighted combination of factors, such as, but not limited to, availability of drive units with cleaning modules and drive unit proximity to the selected portion of the inventory system. However, the selection of a particular drive unit can be revised before, or even during, the cleaning operation by performing periodic status checks of the drive units. For example, the system can detect a fill level in a debris container associated with the drive unit, e.g. by way of a fill sensor in the drive unit (act 1406). So long as the debris container is not full (act 1408), the system can continue a cleaning operation using the drive unit. Otherwise, the system can take corrective action to replace the drive unit. Process steps for handling this exception can include generating a report indicating that a debris container is full (act 1410), generating instructions to route the selected drive unit with a cleaning module to a servicing location for the removal of debris from the debris container (act 1412), and optionally selecting a new drive unit for directing to clean the selected portion of the inventory system (act 1414). In some cases, the system can return the same drive unit to the selected portion of the inventory system after its debris container has been emptied.

The system can also, or alternatively, monitor an airflow rate associated with the drive unit during operation (act 1416). In some embodiments, this airflow rate can be monitored at the location of an air filter of the blower module, or at each air filter if the drive unit uses more than one blower and air filter. So long as the airflow rate remains at or above a threshold, the system can continue to use the selected drive unit (act 1418). However, where the system detects that the airflow rate has fallen below the threshold, the system can take corrective steps to handle the exception. Typically, low airflow rate indicates a problem with the filters, such as a clogged filter, and requires routine replacement. In some cases, however, low airflow rate can indicate damage of other components. A low airflow rate can be detected based on airflow speed. In at least one embodiment, a threshold for sufficient airflow speed is about 1.6 m/s. When the airflow rate falls below the threshold, the system can generate a report indicating an exception with respect to the airflow speed (act 1420). The system can then generate instructions to route the selected drive unit to a servicing location for routine maintenance and/or filter or part replacement (act 1422), and can direct a different drive unit to clean the select portion of the inventory system (act 1424). In some cases, the system can return the same drive unit to clean the portion of the inventory system after servicing.

Figure 15:
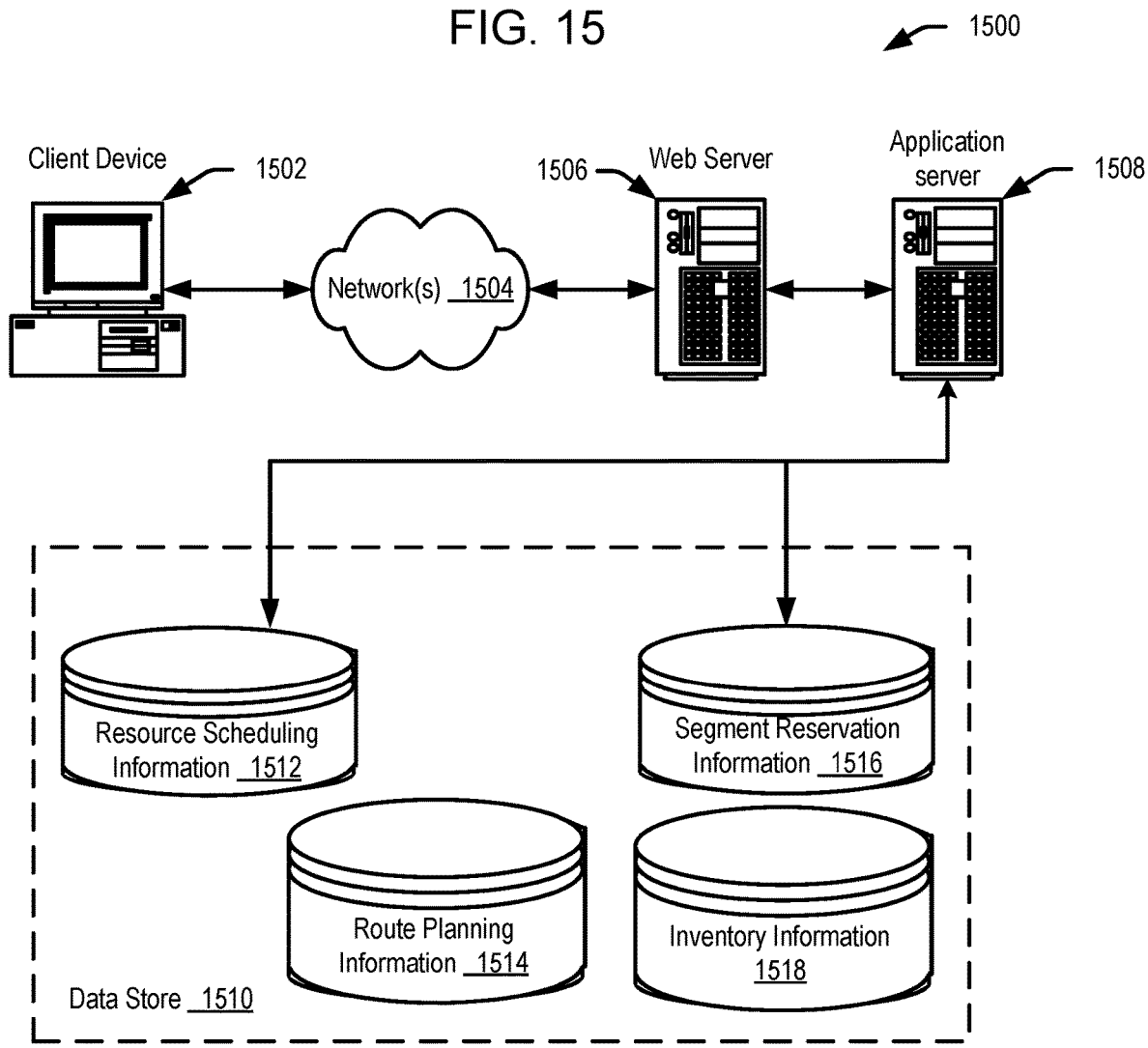
FIG. 15 illustrates an environment in which various features of the inventory system can be implemented, in accordance with at least one embodiment.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing information which can be used by modules described herein, such as resource scheduling information 1512, route planning information 1514, segment reservation information 1516, and/or inventory information 1518. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   a workspace comprising a machine navigable grid defined by an array of fiducial markings on a floor of the workspace;
   inventory holders positioned on the floor in the workspace;
   a plurality of unmanned drive units operable to move the inventory holders about the workspace, wherein a drive unit of the plurality of drive units is operable to remove debris from the workspace, the drive unit comprising:
     a frame;
     a drive module connected with the frame and comprising two drive wheels spaced apart at opposite sides of the drive unit, the drive wheels being operable to move the drive unit in the workspace;
     a blower module connected with the frame and comprising a debris container and at least one blower for generating a pressure differential between the debris container and an exterior environment;
     a first cleaning module connected with the frame and comprising a first duct connected between the exterior environment at a bottom of the drive unit and with an interior of the debris container, and at least one rotary brush positioned at an opening of the first duct, wherein the rotary brush and the opening of the first duct span a width that encompasses paths of both of the two drive wheels, wherein the first cleaning module further comprises a gap having a nonzero width defined between first and second portions of the rotary brush;
     a second cleaning module connected with the frame and comprising a second duct and a cleaning head, the second duct connecting the exterior environment at the bottom of the drive unit with the interior of the debris container and the cleaning head connected with the second duct and positioned in alignment with the gap of the first cleaning module;
   at least one processor; and
   at least one tangible memory device storing non-transitory instructions executable by the at least one processor to:
     receive a request to clean a location in the inventory management system;
     cause the drive unit to navigate to the location using the machine navigable grid; and
     cause the drive unit to perform a cleaning operation at the location whereby the drive unit passes over the location while the first cleaning module cleans the location.

2. The system of claim 1, wherein:
   the gap defined between the first and second portions of the rotary brush is positioned to align with the fiducial markings of the machine navigable grid when the drive unit navigates using the machine navigable grid;

the second cleaning module further comprises a stationary brush connected with the cleaning head and positioned to align with the fiducial markings when the drive unit navigates the machine navigable grid; and
the instructions are further configured to cause the drive unit to clean a first portion of the location that does not include fiducial markings using the first cleaning module and to clean a second portion of the location that does include the fiducial markings using the second cleaning module.

3. The system of claim 1, wherein the instructions are further configured to cause the at least one processor to:
detect a condition associated with one or more of the unmanned drive units; and
generate the request to clean a location associated with the one or more unmanned drive units in response to detecting the condition.

4. The system of claim 1, wherein the instructions are further configured to cause the at least one processor to:
receive path information corresponding to expected transit paths of the one or more unmanned drive units in the workspace; and
cause the drive unit to navigate to the location based on the path information.

5. The system of claim 1, wherein:
the debris container is substantially cylindrical;
the at least one blower comprises first and second blowers positioned at respective first and second ends of the debris container;
the first duct connects with an interior of the debris container along a sidewall of the debris container;
the drive unit further comprises a second duct connected between the exterior environment and the debris container, and a stationary brush connected with the second duct; and
the second duct passes through the sidewall of the debris container and terminates within the interior of the debris container.

6. The system of claim 1, wherein the drive unit further comprises a sensing element configured to detect debris, and wherein the instructions are further configured to cause the drive unit to perform the cleaning operation at a location associated with the debris in response to detecting the debris by the sensing element.

7. An unmanned drive unit, comprising:
a frame;
a drive module connected with the frame and comprising a motor and at least two drive wheels mounted to the frame and operable to move the drive unit;
a blower module connected with the frame and comprising a debris container and at least one blower for generating a pressure differential between the debris container and an exterior environment;
a first cleaning module connected with the frame and comprising:
a first duct connected between the exterior environment at a bottom of the drive unit with an interior of the debris container;
a rotary brush positioned at an opening of the first duct for agitating debris beneath the drive unit, wherein the rotary brush and the opening of the first duct span a width including the at least two drive wheels, wherein the first cleaning module further comprises a gap having a nonzero width defined between first and second portions of the rotary brush; and
a second cleaning module connected with the frame and comprising:

a second duct connecting the exterior environment at the bottom of the drive unit with the interior of the debris container; and
a cleaning head connected with the second duct and positioned in alignment with the gap between the first and second portions of the rotary brush.

8. The unmanned drive unit of claim 7, wherein the second cleaning module further comprises a stationary brush connected with the cleaning head and aligned with the gap between the first and second portions of the rotary brush.

9. The unmanned drive unit of claim 8, wherein:
the opening of the first duct comprises distinct first and second openings in the bottom of the unmanned drive unit, each opening of the first and second openings extending from a respective first and second side of the unmanned drive unit to a respective first and second side of the gap; and
the rotary brush comprises first and second disconnected portions, each of the first and second disconnected portions being positioned across a respective opening of the first and second openings.

10. The unmanned drive unit of claim 7, further comprising a pre-brush element positioned anterior to the first cleaning module to reduce clearance below the unmanned drive unit and trap debris pushed forward by the rotary brush when the unmanned drive unit is in operation.

11. The unmanned drive unit of claim 7, wherein the blower module comprises first and second blowers connected to the debris container at opposing first and second ends of the debris container, and first and second filter assemblies positioned within the debris container for blocking particulates from egress via the first and second blowers, respectively.

12. The unmanned drive unit of claim 11, wherein:
the debris container comprises a substantially cylindrical inner cavity; and
the first duct is connected with the substantially cylindrical inner cavity at a non-orthogonal angle such that, when air passes through the first duct into the substantially cylindrical inner cavity, the air forms a vortex within the substantially cylindrical inner cavity.

13. The unmanned drive unit of claim 7, wherein an air velocity at the opening of the first duct is at least 1.6 m/s, and wherein an open area at the opening of the first duct is at least 80 $cm^2$.

14. The unmanned drive unit of claim 7 further comprising:
a debris sensor operable to detect debris; and
a control module comprising at least one processor and nonvolatile memory containing nontransitory instructions that, when executed by the processor, cause the unmanned drive unit to:
determine, by the debris sensor, whether debris is present at a selected location; and
cause the unmanned drive unit to perform a cleaning operation at the selected location in response to detecting the debris at the selected location.

15. An unmanned drive unit, comprising:
a frame;
a drive module connected with the frame and comprising a motor and at least two drive wheels mounted to the frame and operable to move the drive unit;
a blower module connected with the frame, the blower module comprising:
a debris container;
first and second blowers for generating a pressure differential between the debris container and an exterior environment, the first and second blowers being connected to the debris container at opposing first and second ends of the debris container; and first and second filter assemblies positioned within the debris container for blocking particulates from egress via the first and second blowers, respectively; and a first cleaning module connected with the frame and comprising:
- a first duct connected between the exterior environment at a bottom of the drive unit with an interior of the debris container; and
- a rotary brush positioned at an opening of the first duct for agitating debris beneath the drive unit, wherein the rotary brush and the opening of the first duct span a width including the at least two drive wheels.

16. The unmanned drive unit of claim 15, wherein the first cleaning module further comprises a gap having a nonzero width defined between first and second portions of the rotary brush, and further comprising:

a second cleaning module comprising:
- a second duct connecting the exterior environment at the bottom of the drive unit with the interior of the debris container;
- a cleaning head connected with the second duct; and
- a stationary brush connected with the cleaning head, wherein the second cleaning module is aligned with the gap between the first and second portions of the rotary brush.

17. The unmanned drive unit of claim 16, wherein:
the opening of the first duct comprises distinct first and second openings in the bottom of the unmanned drive unit, each opening of the first and second openings extending from a respective first and second side of the unmanned drive unit to a respective first and second side of the gap; and the rotary brush comprises first and second disconnected portions, each of the first and second disconnected portions being positioned across a respective opening of the first and second openings.

18. The unmanned drive unit of claim 15, further comprising a pre-brush element positioned anterior to the first cleaning module to reduce clearance below the unmanned drive unit and trap debris pushed forward by the rotary brush when the unmanned drive unit is in operation.

19. The unmanned drive unit of claim 15, wherein:
the debris container comprises a substantially cylindrical inner cavity; and the first duct is connected with the substantially cylindrical inner cavity at a non-orthogonal angle such that, when air passes through the first duct into the inner cavity, the air forms a vortex within the inner cavity.

20. The unmanned drive unit of claim 15, wherein an air velocity at the opening of the first duct is at least 1.6 m/s, and wherein an open area at the opening of the first duct is at least 80 $cm^2$.

21. The unmanned drive unit of claim 15, further comprising:
a debris sensor operable to detect debris; and a control module comprising at least one processor and nonvolatile memory containing nontransitory instructions that, when executed by the processor, cause the unmanned drive unit to:
- determine, by the debris sensor, whether debris is present at a selected location; and
- cause the unmanned drive unit to perform a cleaning operation at the selected location in response to detecting the debris at the selected location.

* * * * *